US012591427B2

(12) United States Patent
Klepke et al.

(10) Patent No.: US 12,591,427 B2
(45) Date of Patent: Mar. 31, 2026

(54) PLC-BASED SUPPORT FOR ZERO-DOWNTIME UPGRADES OF CONTROL FUNCTIONS

(71) Applicant: Siemens Aktiengesellschaft, Munich (DE)

(72) Inventors: Steffen Klepke, Munich (DE); Michael Elting, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 76 days.

(21) Appl. No.: 18/275,538

(22) PCT Filed: Nov. 25, 2021

(86) PCT No.: PCT/EP2021/082998
§ 371 (c)(1),
(2) Date: Aug. 2, 2023

(87) PCT Pub. No.: WO2022/171325
PCT Pub. Date: Aug. 18, 2022

(65) Prior Publication Data
US 2024/0311139 A1 Sep. 19, 2024

(30) Foreign Application Priority Data
Feb. 9, 2021 (EP) .................................... 21156073

(51) Int. Cl.
*G06F 8/656* (2018.01)
*G05B 19/05* (2006.01)
(52) U.S. Cl.
CPC ........... *G06F 8/656* (2018.02); *G05B 19/056* (2013.01)
(58) Field of Classification Search
CPC ................................ G06F 8/65; G05B 19/056
See application file for complete search history.

(56) References Cited

U.S. PATENT DOCUMENTS 9,652,220 B2 * 5/2017 Tammam .................. G06F 8/65
9,952,850 B2 * 4/2018 Joshi .................... G06F 11/1433
(Continued)

FOREIGN PATENT DOCUMENTS

CN 110524543 A 12/2019
CN 112219172 A * 1/2021 ......... G05B 19/0426
(Continued)

OTHER PUBLICATIONS

NPL_Chinese Patent Application Publication No. CN 112219172 (Year: 2021).*
(Continued)

*Primary Examiner* — Ziaul A Chowdhury
(74) *Attorney, Agent, or Firm* — Schmeiser, Olsen & Watts LLP

(57) ABSTRACT

A method and arrangement for upgrading a function performed on a technical system including a PLC and an actuator controlled by the PLC. The control function provides an output which controls the actuator. The method includes deploying at least one updated version of the control function on the system while maintaining the current version of the control function on the system, b. the updated version is prevented from controlling the actuator, whereby the current version and the updated version publish control commands in each PLC cycle to a Publish/Subscribe communication module of the PLC, c. in each PLC cycle passing the published control command, d. the information of the published control command of the updated version changes to a primary control command and the published control command of the current version to a secondary control command in a mutual agreement process between the current version and the updated version.

14 Claims, 2 Drawing Sheets

(56) References Cited

U.S. PATENT DOCUMENTS

| | | | | |
|---|---|---|---|---|
| 10,037,203 | B1 | 7/2018 | Chavez et al. | |
| 10,360,020 | B2 | 7/2019 | Hirshberg | |
| 10,365,626 | B2 | 7/2019 | Lo et al. | |
| 11,777,802 | B2 * | 10/2023 | Sarood | H04L 43/0817 |
| 2005/0149922 | A1 | 7/2005 | Vincent | |
| 2016/0070717 | A1 | 3/2016 | Bergner et al. | |
| 2016/0239011 | A1 * | 8/2016 | Lo | G05B 19/042 |
| 2018/0150061 | A1 * | 5/2018 | Yang | G05B 19/0423 |
| 2019/0025788 | A1 * | 1/2019 | Ganapathi | G06F 9/44536 |
| 2021/0365023 | A1 * | 11/2021 | Yunoki | G06F 8/65 |
| 2022/0100527 | A1 * | 3/2022 | Viste | G05B 19/056 |

FOREIGN PATENT DOCUMENTS

| | | | | |
|---|---|---|---|---|
| EP | 3502875 | A1 | 6/2019 | |
| EP | 3764221 | A1 * | 1/2021 | G06F 11/3698 |
| KR | 20180119783 | A | 11/2018 | |

OTHER PUBLICATIONS

NPL_EP 3764221 A1_English Translated Version. (Year: 2021).*

Wikipedia: "Programmable logic controller", Date Accessed: Aug. 2, 2023. URL: <https://en.wikipedia.org/wiki/Programmable_logic_controller>.

PCT International Preliminary Report on Patentability mailed Jun. 1, 2023 corresponding to PCT International Application No. PCT/EP2021/082998 filed Nov. 25, 2021.

PCT International Search Report and Written Opinion of International Searching Authority mailed Mar. 10, 2022 corresponding to PCT International Application No. PCT/EP2021/082998 filed Nov. 25, 2021.

https://en.wikipedia.org/wiki/Programmable_logic_controller [zuletzt aufgerufen am Apr. 11, 2024].

* cited by examiner

FIG 2

| Function name | Cycle | MoveCommand | IsPrimary |
|---|---|---|---|
| MoveRobot V1 | 98 | turn left | true |
| MoveRobot V2 | 98 | turn right | false |
| MoveRobot V1 | 99 | turn left | true |
| MoveRobot V2 | 99 | turn right | false |
| MoveRobot V1 | 100 | turn left | false |
| MoveRobot V2 | 100 | turn right | true |
| MoveRobot V1 | 101 | turn left | false |
| MoveRobot V2 | 101 | turn right | true |

PLC-BASED SUPPORT FOR ZERO-DOWNTIME UPGRADES OF CONTROL FUNCTIONS

CROSS-REFERENCE TO RELATED APPLICATIONS

This application claims priority to PCT Application No. PCT/EP2021/082998, having a filing date of Nov. 25, 2021, which claims priority to EP application Ser. No. 21/156, 073.5, having a filing date of Feb. 9, 2021, the entire contents both of which are hereby incorporated by reference.

FIELD OF TECHNOLOGY

The following relates to a computer-implemented method for upgrading at least one control function performed on a technical system, the technical system comprising a PLC and at least one actuator controlled by the PLC. The control function is adapted to provide an output which controls the actuator, e.g., movement of a robot. The following further relates to an arrangement with a PLC using the computer-implemented method.

BACKGROUND

A PLC (Programmable Logic Controller, in German: SPS-Speicher-programmierbare Steuerung) providing a Publish/Subscribe1 communication module (according to the communication standard OPC UA PubSub) needs to support zero-downtime updates of connected control functions from one version to another version while the control function and its actuators are running (zero-downtime deployment).

As an example, a control function "MoveRobot V1.0" is publishing control commands into the PLC actuator outputs controlling movements of a robot. This control function shall be eventually replaced by another version "MoveRobot V2.0" through an update while the robot hardware (respectively MoveRobot V1.0) is running. Therefore, both control functions MoveRobot V1.0 and MoveRobot V2.0 need to run in parallel, whereas only one control function, MoveRobot V1.0 or MoveRobot V2.0, shall control the robot. During the update process the actual control will be handed over from the running control function MoveRobot V1.0 to the running control function MoveRobot V2.0. This update process during operation of the entire system needs to be supported by the PLC.

Current PLCs do not support such a zero-downtime update scenario due to following shortcomings:

a) PLCs do not support deployment and execution of two different control functions with an identical function/ file name (e.g. "MoveRobot") running in parallel at the same time.

b) Modern PLCs provide a Publish-Subscribe data bus (=communication module), where control functions can register as publisher for a PubSub topic to publish control commands to the data bus via the registered PubSub topic (e.g. MoveCommand). Other functions and apps can subscribe to this and other PubSub topics to receive control commands and pass them to their connected physical devices, e.g. the robot.

Nevertheless, in current PLC implementations two or more control functions, running in parallel (not even with different file/function names), being registered as publisher to the same PubSub topic, e.g., MoveCommand cannot publish control commands exclusively to the PLC. The problem here is: Once both control functions are up and running and both have registered as publisher on the same PLC PubSub topic, both functions do publish control commands to the same PubSub topic in parallel and in every scan cycle in a competitive way. Subsequently, the PLC cannot explicitly determine which of both commands shall be passed to the actuator. Usually, the PLC passes the command which was set at last in the PLC's PubSub topic within the current scan cycle.

A PLC works in a program scan cycle (in short: PLC cycle), where it executes its program repeatedly. The simplest scan cycle consists of three steps:

read inputs, execute the program, write outputs.

The program follows the sequence of instructions. It typically takes a time span of tens of milliseconds for the processor to evaluate all the instructions and update the status of all outputs.

More details about the functionality of a PLC are for example disclosed in: https://en.wikipedia org/wiki/Programmable_logic_controller.

The U.S. Pat. No. 10,365,626 B2 discloses a programmable logic controller comprises a processor and a programmable logic controller operating environment that is configured to execute a controller automation program providing multiple skill functions. A device memory is provided with multiple applications that is configured to perform a discrete set of automation functions using multiple skill functions. A real-time data backbone is configured to maintain the state information associated with multiple skill functions.

The patent application US 2005/149922 A1 discloses a dynamic computer application update method in distributed computer networks, involves receiving updates comprising source codes related to applications, and updating applications based on server notification. Updates comprising the source codes related to the computer application are received by subscribing with publish/subscribe server. An update notification or an update is received from the server. Update is applied to the application during execution without restarting the application.

The U.S. Pat. No. 10,360,020 B2 discloses a vehicle such as electric vehicle, rechargeable electric vehicle, and/or hybrid-electric vehicle, has hypervisor that blocks second output from sent to hardware interface. The vehicle has a memory, a hardware interface in communication with a system of the vehicle. The system controls a function of the vehicle. A processor is in communication with the memory. The processor executes a first virtual machine (VM) that executes a first operating system (OS). A second VM executes a second OS. A hypervisor is in communication with the first VM, the second VM, and the hardware interface. The hypervisor receives an input from the hardware interface. The hypervisor forwards the input to the first VM and the second VM. The hypervisor receives a first output from the first VM. The hypervisor forwards the first output to the hardware interface. The hypervisor receives a second output from the second VM. The hypervisor blocks the second output from sent to the hardware interface.

SUMMARY

An aspect relates to provide a solution for zero-downtime upgrades of control functions of a PLC.

The desired PLC support is as follows:

PLC supports deployment and execution of two control functions with identical name (e.g. MoveRobot)

While both control functions run in parallel, only one control function is controlling the actuator (primary control function). The other control function shall be up and running but shall not (yet) publish control commands to the PLC PubSub topic (the secondary control function having muted actuator output)

The PLC needs to support the concept of having a primary and secondary control function—both having the same file/function name, both running in parallel, both being registered as publisher for control commands on the same PLC PubSub topic. Only the commands of the primary control functions shall be passed by the PLC PubSub engine to the actuator (e.g., robot).

Update of control functions with interrupt; current PLCs do not support deployment of alternative control functions with the same name and run them in parallel. Only one of multiple control functions with the same name can run exclusively. An update would require stopping and un-deploying the current control function. Then deploy and start the new control function.

Embodiments of the invention addresses the required support of a PLC for zero downtime updates of control functions. It discloses PLCs which provide a cyclic PubSub data bus which decouples a control function from physical actuators. In a further aspect of embodiments of the invention refers to control functions which are implemented in higher-level programming languages such as C++. It does not cover control functions implemented with PLC programming languages covered by IEC 61131-3 4

The CFC approach does not provide information about parallel deployments of CFCs where one CFC is the primary control function, and the parallel CFC is the secondary control function. It does not provide information whether control is handed over between the two parallel control functions. It states the Type Change in Run approach is an update in run which seems to be not revertible quickly in case of errors.

To support above described zero-downtime updates of a control function a PLC needs to be capable of following:

Deploy and run two alternative versions of a control function (e.g., MoveRobot V1.0 and MoveRobot V2.0).

Both control functions must be able to register as a publisher on the same PLC PubSub topic, e.g. Move-Command.

Both control functions must run in parallel. Note, the control functions themselves know their primary/secondary state. They also know how to hand over actual control between themselves, as for example disclosed in the patent application EP 3502875 A1, "Seamless and safe upgrades of software intensive systems during operation".

Both control functions publish their commands in each cycle to the PLC PubSub topic plus an additional information about whether the published control command is a primary command or a secondary command.

The PLC stores both control commands plus the related information whether it is a primary or a secondary control command The PLC passes only the primary command to the receiving apps/functions/subscriber of this PubSub topic Embodiments of the invention comprise a computer-implemented method for upgrading at least one control function performed on a technical system, the technical system comprising a PLC and at least one actuator controlled by the PLC, wherein the control function is adapted to provide an output which controls the actuator, wherein the computer-implemented method is adapted to:

a. deploying at least one updated version of the control function on the system while maintaining the current version of the control function on the system, b. whereby the current version and the updated version publish their commands in each PLC cycle to a Publish/Subscribe communication module of the PLC additionally with an information about whether the published control command is a primary control command or a secondary control command, and c. in each PLC cycle passing the published control command, only if it is a primary control command, to the actuator by the PLC d. whereby the information of the published control command of the updated version changes to a primary control command and the published control command of the current version to a secondary control command in a mutual agreement process between the current version and the updated version.

In a further embodiment of the method the PLC is configured to parallel handle the control function and the updated version of the control function, whereby both control functions have the same file and/or function name, both are running in parallel, both being registered as publisher for control commands on the same PLC Publish/Subscribe communication module.

In a further embodiment of the method the control function is controlling a machine, e.g., a movement of a robot.

In a further embodiment of the method the control function and the updated version of the control function are publishing their control commands in each cycle to the PLC Publish/Subscribe communication module plus the additional information about whether the published control command is a primary command or a secondary command.

In a further embodiment of the method the control function is written in higher-level programming language in C++.

In a further embodiment of the method the cyclic Publish/Subscribe communication module is decoupling the control function from the actuator.

Embodiments of the invention further comprise an arrangement for upgrading at least one control function, comprising a PLC and at least one actuator controlled by the PLC, wherein the control function is adapted to provide an output which controls the actuator, wherein:

at least one updated version of the control function is deployed while maintaining the current version of the control function, wherein the PLC is designed and programmed, that the current version and the updated version publish their commands in each PLC cycle to a Publish/Subscribe communication module of the PLC, and additionally with an information about whether the published control command is a primary control command or a secondary control command, and wherein the PLC is designed and programmed passing in each PLC cycle the published control command, only if it is a primary control command, to the actuator, whereby the information of the published control command of the updated version changes to a primary control command and the published control command of the current version to a secondary control command in a mutual agreement process between the current version and the updated version.

In a further embodiment of the arrangement the PLC is designed and programmed parallel handling the control function and the updated version of the control function, whereby both control functions have the same file and/or function name, both are running in parallel both being registered as publisher for control commands on the same PLC Publish/Subscribe communication module.

In a further embodiment of the arrangement according the control function is designed controlling a machine, e.g. movement of a robot.

In a further embodiment of the arrangement the control function and the updated version of the control function are publishing their control commands in each cycle to the PLC Publish/Subscribe communication module plus the additional information about whether the published control command is a primary command or a secondary command.

In a further embodiment of the arrangement the control function is written in higher-level programming language in C++.

In a further embodiment of the arrangement the cyclic Publish/Subscribe communication module is designed and programmed decoupling the control function from the actuator.

Embodiments of the invention differs from the Continuous Function Chart (CFC) approach according to state of the art and is advantageous over state of the art as follows:

a. It addresses zero-down time updates of control functions written in higher-level programming languages, e.g. C++. The CFC approach addresses Continuous Function Charts. A graphical language to implement control functions b. Embodiments of the invention address PLCs that provide a cyclic PubSub data bus which decouples control functions from physical actuators. The CFC approach does not provide information about existence of a cyclic PubSub engine in PCS 7. It rather states that control commands are directly mapped to actuators.

c. Embodiments of the invention target a parallel deployment of two alternative control functions where actual control can be safe and seamlessly passed from one version to another, e.g. from MoveRobot V1.0 to MoveRobot V2.0 and the other way around, e.g. in case of errors after an update to MoveRobot V2. The Pub-Sub-based PLC passes only the control commands of the primary control function to the actuators. The CFC approach does not provide information about parallel deployments of CFCs where one CFC is the primary control function, and the parallel CFC is the secondary control function. It does not provide information whether control is handed over between the two parallel control functions. It states the Type Change in Run approach is an update in run which seems to be not revertible quickly in case of errors.

The new approach allows a seamless and safe update of an industrial control function using a PLC to set control commands to its actuators without stopping and interrupting the actuators for the update process. Furthermore, it allows to test the new control function (e.g. MoveRobot V2.0) in field, on the target hardware and with real data from the field (e.g. robot sensor data) before this new control function is eventually activated to take over control of the actuators.

BRIEF DESCRIPTION

Some of the embodiments will be described in detail, with reference to the following figures, wherein like designations denote like members, wherein:

FIG. 2 shows a spreadsheet of the commands of FIG. 1.

DETAILED DESCRIPTION

Figure 1:
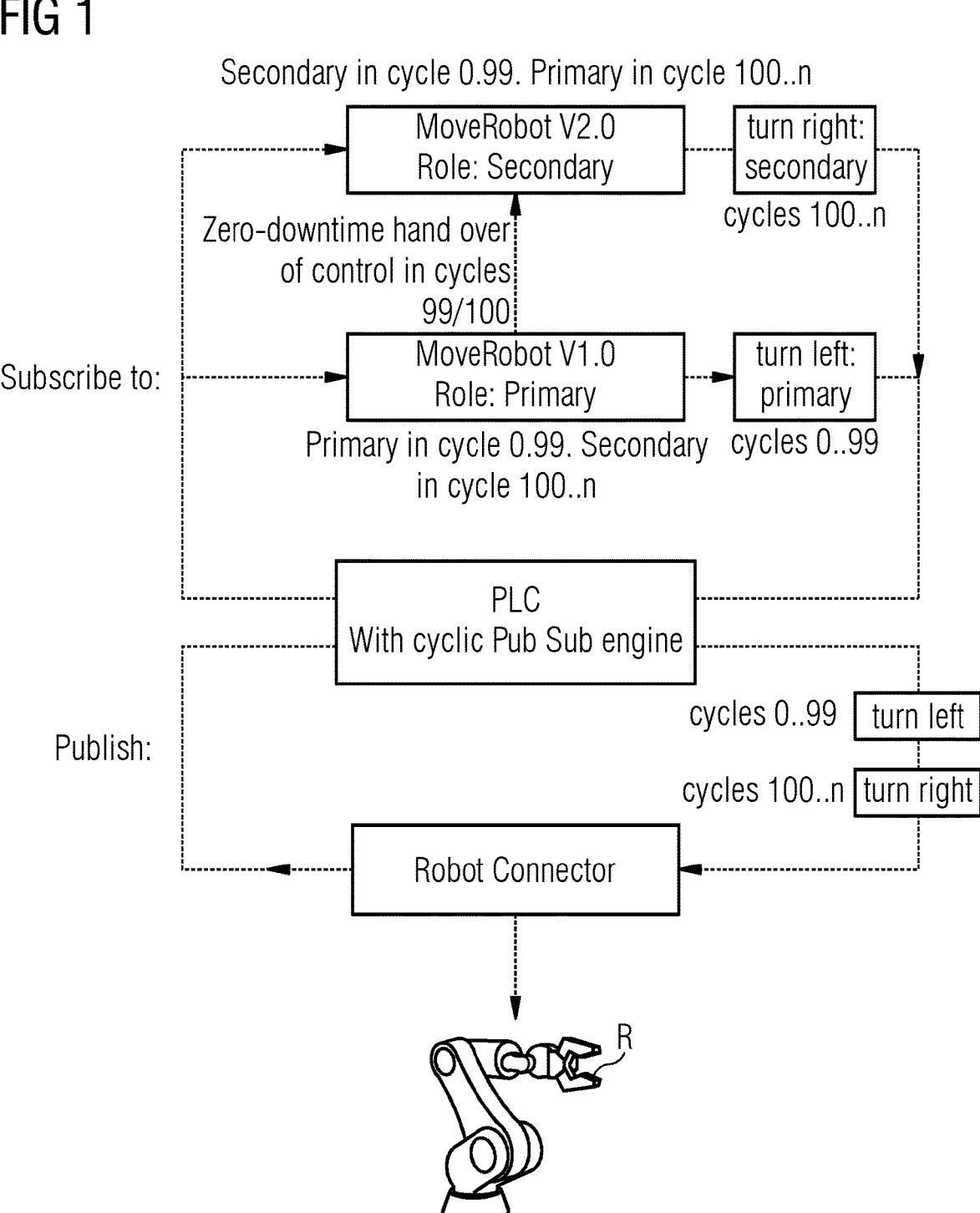
FIG. 1 shows a block diagram of an embodiment with movement of a robot.

Before any embodiments of the invention are explained in detail, it is to be understood that embodiments of the invention are not limited in its application to the details of construction and the arrangement of components set forth in the following description or illustrated in the following drawings. Embodiments of the invention are capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "connected" and "coupled" are used broadly and encompass both direct and indirect connecting and coupling. Also, electronic communications and notifications may be performed using any known means including wired connections, wireless connections, etc.

It should also be noted that a plurality of hardware and software-based devices, as well as a plurality of different structural components may be utilized to implement embodiments of the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of embodiments of the invention may be implemented in software (e.g., stored on non-transitory computer-readable medium) executable by one or more processors. As such, it should be noted that a plurality of hardware and software-based devices, as well as a plurality of different structural components may be utilized to implement embodiments of the invention. For example, "control units" and "controllers" described in the specification can include one or more processors, one or more memory modules including non-transitory computer-readable medium, one or more input/output interfaces, and various connections (e.g., a system bus) connecting the components.

As an example of embodiments of the invention FIG. 1 shows a block diagram of a PLC controlling a robot R by the control functions MoveRobot V1.0 and MoveRobot V2.0 with the control commands "turn left" and "turn right". "Turn left" and "turn right" represents a command sequence, e.g., turn left by 90 degrees, when finished turn back to 0 degree. FIG. 2 shows the corresponding spreadsheet with the valid command in each PLC cycle (=cycle 0 to 100).

In cycle 0 . . . 99 the control function MoveRobot V1.0 publishes commands "turn left" via the PubSub topic MoveCommand including the information that this is a primary command.

In parallel (cycles 0 . . . 99) the control function MoveRobot V2.0 publishes commands turn right via the PubSub topic MoveCommand including the information that this is a secondary command.

In all PLC cycles the PLC passes only the primary command to the related actuators/subscribers, in this embodiment to the robot R. In cycles 0 . . . 99 the primary command is turn left provided by the control function MoveRobot V1.0.

In cycle 100 the two control functions MoveRobot V1.0 and V2.0 arranged with each other (and without the help of the PLC) that the control of the actuators is handed over from MoveRobot V1 to MoveRobot V2.0.

This means, MoveRobot V1.0 changes its internal state from being the primary control function to be secondary control function. MoveRobot V2.0 on the other hand side changes its internal state accordingly from being secondary control function to be primary control function. Note, a detailed description of this hand-over process is not part of this application. It is described in the separate patent application EP 3502875 A1.

The novelty of this approach is that the PLC with a PubSub data bus (=Publish/Subscribe module) supports above described zero-downtime updates of PLC control functions during operation of the entire system. In particular, the PLC supports parallel publishing of control commands from two alternative control functions on the same PLC PubSub topic incl. an indicator which command is the primary and secondary command. Based on this the PLC passes only the primary command to the actuators. With this the PLC supports a safe and seamless hand-over of control from one control function version to another control function version. No explicit start/stop/interrupt of the control functions and related actuators is required to hand over control from one version to another.

This approach does not only include version updates as described above (MoveRobot V1.0 to MoveRobot V2.0) it also supports a safe and seamless handover to a "standby version" of the control function, e.g., a version that is able to run with minimum resources in case of PLC resource overload.

In combination with a Continuous Integration & Continuous Delivery (CI/CD) pipeline software updates for a PLC-based control function can be fully automated starting from building, testing, and packaging the software, delivery, and deployment of the new control function on the target device until a fully automated, safe, and seamless update of the control function on the target device while the system is running.

Another advantage of the described PLC primary/secondary command support is so-called in-field software revision or in-field testing. The secondary version of the control function runs in parallel to the primary version on the on the target device without controlling actuators. However, it does consume real sensor information, e.g., robot servo position, current, temperature, speed, etc. The new (secondary) control function can be tested with these real data from the field sensors for an arbitrary period (seconds, hours, months). Due to this no simulation data is required to test the software in a lab environment. This in-field testing mitigates the risk software updates. The new control function does not necessarily need to be activated to become the primary control function. This use case is only about testing the software in field.

In general, the realization of the new approach allows a faster, more reliable, and automated deployment of new PLC control functions during operation. It helps industrial system and software provider to quickly respond to changes (e.g., new customer requests, software faults, etc). Instead of accepting primary and secondary control commands from two alternative control functions as described above a PLC can support zero-downtime updates as follows.

A control function can register to the PLC PubSub data bus as publisher of control commands.

Once the control function is running the control commands of this control function are not automatically set to the PubSub data bus by the PLC. As is situation: In each cycle the PLC passes the entire process image of the control function into the PLCs memory/PubSub data bus Instead, the control function itself shall decide in each cycle whether to publish control commands to the PLC PubSub data bus and which control commands to publish.

Control commands which were published in previous cycles to the PLC PubSub data bus must not be available in subsequent cycles in the PLC data bus (no data traces from previous cycles).

Other solutions are:

Zero downtime update of control functions publishing on different PubSub topics: A workaround for zero-downtime updates of a PLC control function is to deploy and execute two alternative versions of a control function on a PLC and execute them in parallel (e.g. V1.0, V2.0). Both control functions are sending to different PLC PubSub topics, e.g. control function V1.0 sends on PubSub topic MoveCommand_BLUE, whereas V2.0 sends on topic MoveCommand_GREEN.

Disadvantage of the solution is: The app receiving these control commands needs to subscribe to both topics, MoveCommand_BLUE and MoveCommand_GREEN and has to be informed in each cycle from which of the two PLC PubSub topics it shall take the commands to be passed to the hardware.

Seamless exchange of redundant PLC hardware: In this approach two redundant PLC hardware are provided, hosting identical control functions (or alternative versions of the same control function, e.g. V1.0 and V2.0). Both PLC hardware nodes can take over control of connected actuators seamlessly while the control functions are running on both PLCs.

Instead of updating a single software function here the entire PLC hardware including all its control functions are replaced.

Siemens SIMATIC Process Control System PCS7—CFC Type Change in Run: This approach targets the definition of control functions via Continuous Function Charts (CFC). Changes on a CFC can be deployed and executed without stopping the control system.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for upgrading at least one control function performed on a technical system, the technical system comprising a programmable logic controller (PLC) and at least one actuator controlled by the PLC, wherein the at least one control function is configured to provide an output which controls the at least one actuator, the computer-implemented method comprising:

a. deploying at least one updated version of the at least one control function on the technical system while maintaining a current version of the at least one control function on the technical system;

b. whereby the current version and the updated version publish control commands in each PLC cycle to a Publish/Subscribe communication module of the PLC, and additionally an information about whether the published control command is a primary control command or a secondary control command;

c. in each PLC cycle passing the published control command only if it is a primary control command, to the at least one actuator by the PLC; and d. whereby the information of the published control command of the updated version changes to a primary control command and the published control command of the current version to a secondary control command in a mutual agreement process between the current version and the updated version;

wherein the mutual agreement process between the current version and the updated version occurs without involvement of the PLC.

2. The method according to claim 1, whereby the PLC is configured to parallel handle the at least one control function and the updated version of the control function, whereby the current version of the at least one control function and the updated version of the at least one control function have a same file and/or function name, both are running in parallel, and both being registered as publisher for control commands on the same PLC Publish/Subscribe communication module.

3. The method according to claim 1, whereby the at least one control function is controlling a machine.

4. The method according to claim 3, whereby the machine is a robot, and the at least one control function is controlling a movement of the robot.

5. The method according to claim 1, whereby the at least one control function and the updated version of the at least one control function are publishing control commands in each PLC cycle to the PLC Publish/Subscribe communication module plus the additional information about whether the published control command is a primary command or a secondary command.

6. The method according to claim 3, whereby the at least one control function is written in higher-level programming language.

7. The method according to claim 1, whereby the cyclic Publish/Subscribe communication module is decoupling the at least one control function from the at least one actuator.

8. A technical system comprising:

a programmable logic controller (PLC); and at least one actuator controlled by the PLC, wherein at least one control function deployed on the technical system is configured to provide an output which controls the at least one actuator;

wherein at least one updated version of the at least one control function is deployed while maintaining a current version of the at least one control function, wherein the PLC is designed and programmed, that the current version and the updated version publish commands in each PLC cycle to a Publish/Subscribe communication module of the PLC, and additionally with an information about whether the published control command is a primary control command or a secondary control command, and wherein the PLC is designed and programmed passing in each PLC cycle the published control command, only if itis a primary control command, to the at least one actuator, whereby the information of the published control command of the updated version changes to a primary control command and the published control command of the current version to a secondary control command in a mutual agreement process between the current version and the updated version;

wherein the mutual agreement process between the current version and the updated version occurs without involvement of the PLC.

9. The arrangement according to claim 8, whereby the PLC is designed and programmed parallel handling the at least one control function and the updated version of the at least one control function, whereby the current version of the at least one control function and the updated version of the at least one control function have a same file and/or function name, both are running in parallel both being registered as publisher for control commands on the same PLC Publish/Subscribe communication module.

10. The arrangement according to claim 8, whereby the at least one control function is designed controlling a machine.

11. The arrangement according to claim 10, whereby the machine is a robot, and the control function is controlling a movement of the robot.

12. The arrangement according to claim 8, whereby the at least one control function and the updated version of the control function are publishing control commands in each PLC cycle to the PLC Publish/Subscribe communication module plus the additional information about whether the published control command is a primary command or a secondary command.

13. The arrangement according to claim 8, whereby the at least one control function is written in higher-level programming language.

14. The arrangement according to claim 8, whereby the cyclic Publish/Subscribe communication module is designed and programmed decoupling the at least one control function from the at least one actuator.

* * * * *